(12) United States Patent
Dentone et al.

(10) Patent No.: US 9,009,019 B2
(45) Date of Patent: Apr. 14, 2015

(54) ELECTRICAL OPTIMIZATION AND COMPONENT SELECTION IN AN ELECTRICAL GRID

(71) Applicant: Itron, Inc., Liberty Lake, WA (US)

(72) Inventors: Laura Dentone, Spokane, WA (US); James Poxleitner, Cottonwood, ID (US)

(73) Assignee: Itron, Inc., Liberty Lake, WA (US)

( * ) Notice: Subject to any disclaimer, the term of this patent is extended or adjusted under 35 U.S.C. 154(b) by 0 days.

(21) Appl. No.: 13/933,968

(22) Filed: Jul. 2, 2013

(65) Prior Publication Data

US 2014/0058716 A1 Feb. 27, 2014

Related U.S. Application Data

(60) Provisional application No. 61/692,369, filed on Aug. 23, 2012.

(51) Int. Cl.
*G06G 7/54* (2006.01)
*G06F 17/50* (2006.01)

(52) U.S. Cl.
CPC ........ *G06F 17/5022* (2013.01); *G06F 17/5036* (2013.01); *G06F 17/509* (2013.01); *Y04S 40/22* (2013.01); *Y02E 60/76* (2013.01); *G06F 2217/78* (2013.01)

(58) Field of Classification Search
None
See application file for complete search history.

(56) References Cited

U.S. PATENT DOCUMENTS

| 6,856,148 | B2 | 2/2005 | Bodenstab | |
|---|---|---|---|---|
| 7,480,887 | B1 * | 1/2009 | Hsu | 716/129 |
| 2002/0112212 | A1 | 8/2002 | Cohn et al. | |
| 2004/0054979 | A1 * | 3/2004 | Bobba et al. | 716/13 |
| 2004/0060014 | A1 | 3/2004 | Khalil | |
| 2007/0035900 | A1 * | 2/2007 | Huber et al. | 361/56 |
| 2007/0094630 | A1 * | 4/2007 | Bhooshan | 716/13 |
| 2011/0113398 | A1 * | 5/2011 | Keinert et al. | 716/127 |

(Continued)

FOREIGN PATENT DOCUMENTS

| JP | 2010186320 | 8/2010 |
|---|---|---|
| WO | WO2007054925 | 5/2007 |

OTHER PUBLICATIONS

Fletcher et al. Optimal Distribution System Horizon Planning—Part I: Formulation IEEE Transactions on Power System, vol. 22, No. 2, May 2007.*

(Continued)

*Primary Examiner* — Omar Fernandez Rivas
*Assistant Examiner* — Cuong Luu
(74) *Attorney, Agent, or Firm* — Lee & Hayes, PLLC (57) ABSTRACT

Techniques for optimizing a distribution circuit (e.g., electric power grid) are described. Primary wiring of a distribution circuit may comprise a plurality of unique primary paths, from a source to an end (a transformer). Each primary path may include a plurality of primary segments, and each primary segment may be in one or more primary paths. A maximum voltage drop on any primary segment may be selected as a smallest of maximum allowed voltage drops across that segment in each of the primary paths. Because the voltage drop across each primary path must be less than a prescribed maximum, the sum of the voltage drops across each primary segment in that primary path is less than the prescribed maximum. The prescribed maximum may be adhered to if each primary segment is constructed of a conductor gauge chosen not to exceed the maximum voltage drop for that segment.

18 Claims, 8 Drawing Sheets

(56) References Cited

U.S. PATENT DOCUMENTS

2011/0271241 A1* 11/2011 Krishnamoorthy et al. .. 716/102
2014/0039710 A1*  2/2014 Carter et al. ................. 700/291

OTHER PUBLICATIONS

Emanuel et al. Electric Power Quality Annu. Rev. Energy Environ. 1997. 22, pp. 263-303.*

Wattanasophon et al. Power Distribution System Planning with GIS Consideration The International conference on Electrical Engineering Jul. 6, 2008, No. O-156.*

PCT Search Report and Written Opinion mailed Sep. 25, 2013 for PCT applciation No. PCT/US13/48763, 9 pages.

Fletcher et al., "Optimal Distribution System Horizon Planning—Part II: Application," IEEE Transactions on Power Systems, vol. 22, No. 2, May 2007, pp. 862-870.

* cited by examiner

FIG. 8

ELECTRICAL OPTIMIZATION AND COMPONENT SELECTION IN AN ELECTRICAL GRID

RELATED APPLICATIONS

This patent application claims priority to U.S. patent application Ser. No. 61/692,369, titled "Electrical Optimization and Component Selection in an Electrical Grid", filed on 23 Aug. 2012, commonly assigned herewith, and hereby incorporated by reference.

BACKGROUND

An electrical utility company may design and manage a power distribution circuit—i.e., an electrical "layout" or grid. The electrical distribution circuit may include primary wiring, a plurality of transformers and secondary wiring from each of the transformers to houses, businesses and other consumers. A large number of design requirements and constraints may complicate the design of the electrical distribution circuit. Primary circuits may be required over a large number of paths of different lengths, which provide different voltage levels and supply differently sized loads over primary wiring having different impedance characteristics. A number of differently-sized transformers may be required to provide power to varying numbers of customers having varying consumption expectations. Many customers may require single-phase power, while others may require three-phase power. Moreover, on both the primary and secondary sides of the plurality of transformers, a number of decisions regarding wire gauge must be made to provide a reliable flow of electricity while minimizing costs.

The layout of such a distribution circuit, particularly involving large numbers of circuit elements and multiple power phases, may be difficult to design using known tools.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components. Moreover, the figures are intended to illustrate general concepts, and not to indicate required and/or necessary elements.

DETAILED DESCRIPTION

Overview

An electrical analysis module, operable on a computing device, may provide an important tool to a designer of a power distribution circuit. Such a module can help the designer determine if a distribution circuit would be functional and if electrical requirements are met. Unfortunately, existing electrical analysis modules may not be capable of changing equipment to meet the electrical requirements and they may fail to optimize the circuit (e.g., the cost of components within the circuit may be considerably more than is optimal).

The techniques described herein are directed to electrical optimization and component selection in an electrical grid. In some instances, an electrical optimization module may be used in addition to an electrical analysis module. The electrical optimization module may be configured to assist the designer in selecting optimal sizes for components such as secondary wiring, transformers and primary wiring. For example, selection of a correct gauge of primary wiring (commonly referred to as primary conductor) may reduce costs of the power distribution circuit while still exceeding design requirements for each part of the circuit. Similarly, correct sizing of secondary wiring (secondary conductor) and transformers will also result in both lower costs and conformance to design requirements.

It is particularly important that an electrical design is built to satisfy customer usage requirements under multiple loading conditions. For example, in some parts of the country the energy demands are significantly different between summer and winter. Accordingly, the electrical equipment may be designed to handle a greater load under peak conditions in different seasons. In order to support these differences in the same electrical design, there are different design requirements for each condition and for each of these conditions may be analyzed and optimized independently. Additionally, customer loads may need to be served through different routes in the electrical grid for the sake of safety, reliability and extreme loading conditions, caused by routine or non-routine maintenance, emergency storm damage or peak loading conditions. Operating equipment, such as automated or non-automated switches are used to change the direction of flow of electricity to customer loads from an alternate source. For these alternate operating conditions, other design criteria may be evaluated as appropriate levels of design. For example, many transformers are capable of running at 200% of their rated power for a short period of time. This creates another entirely different design and set of design conditions. The optimization of each analysis condition and each source point may be combined to build the optimized solution for all scenarios. One or more project specific source points are used in the analysis of all designs. For the purposes of distribution design projects, an electrical source may be considered to represent the source of distribution voltage electricity at a substation, or may be arbitrarily designated at any known point along a primary distribution circuit that will support the flow of electricity to the customer loads for this design. The source of power to a particular load can be changed at any given time by changing the normally open or normally closed equipment (switches, elbows on a transformer, etc) in the distribution network.

A particular problem is presented by primary wiring. "Primary runs" or "primary paths" are lengths of primary wiring from a source (e.g., a substation) to a primary end (e.g., a transformer that outputs to secondary wiring). Each primary path must have a voltage drop that is less than a total allowable primary voltage drop (e.g., a predetermined voltage drop). Each branch in the primary circuitry results in another primary path, or another set of primary paths. For example, two primary paths may share some primary segments in common from the power source, but a branch may result in the two primary paths including different primary segments which terminate at different transformers.

Thus, the total voltage drop of each primary path is the sum of the voltage drops over the primary segments that make up that primary path. To optimize the primary portion of the distribution circuit, each primary segment may have a primary conductor that is minimally sized (i.e., least cost), but that results in a voltage drop that, when added to the voltage drops across other primary segments, does not result in the primary path exceeding an allowed voltage drop. In one example, in optimization of such primary segments, each primary path that includes a primary segment is evaluated to determine a maximum voltage drop for that primary segment. After finding a maximum voltage drop for that primary segment in each of a plurality of primary paths, the smallest of the maximum voltage drops is selected for association with the primary segment. The selected voltage drop indicates impedance for the primary segment, and by extension, a gauge of primary conductor that should be selected for the primary segment.

The discussion herein will include systems and methods to size primary conductors in a way that lowers cost and also conforms to design requirements. The discussion includes several sections. Each section is intended to be an example of techniques and/or structures, but is not intended to indicate elements which must be used and/or performed. A section entitled "Example Distribution Circuit" illustrates and describes a distribution circuit and/or a portion of a power grid. The circuit includes a power source, primary conductor, transformers and secondary wiring from the transformers to a plurality of meters at customer sites. A section entitled "Example Electrical Optimization Module" illustrates and describes a computing system configured with an example electrical optimization module for optimizing aspects of a distribution design and/or portions of an electric grid. In particular, portions of the module are configured for optimizing secondary conductor sizing, transformer sizing and primary conductor sizing. Next, a section entitled "Example Methods" discusses aspects of methods operational in devices including processors, memory devices, application specific integrated circuits (ASICs), etc. A section entitled "Example Primary Conductor Sizing" illustrates and describes an example process by which the primary conductors may be sized. Primary conductors comprise the wiring from the source (e.g., substation) to the transformer, and the size or gauge of such wire influence both the voltage drop across such wires and also the cost of the distribution system. A section entitled "Example Optimizing Multiple Design Scenarios" depicts the process of combining multiple electrical scenarios to build an optimized solution for all scenarios using a single choice of material for each component in the design. The discussion ends with a brief "Conclusion."

This brief introduction, including section titles and corresponding summaries, is provided for the reader's convenience and is not intended to describe and/or limit the scope of the claims or any section of this disclosure.

Example Distribution Circuit

Figure 1:
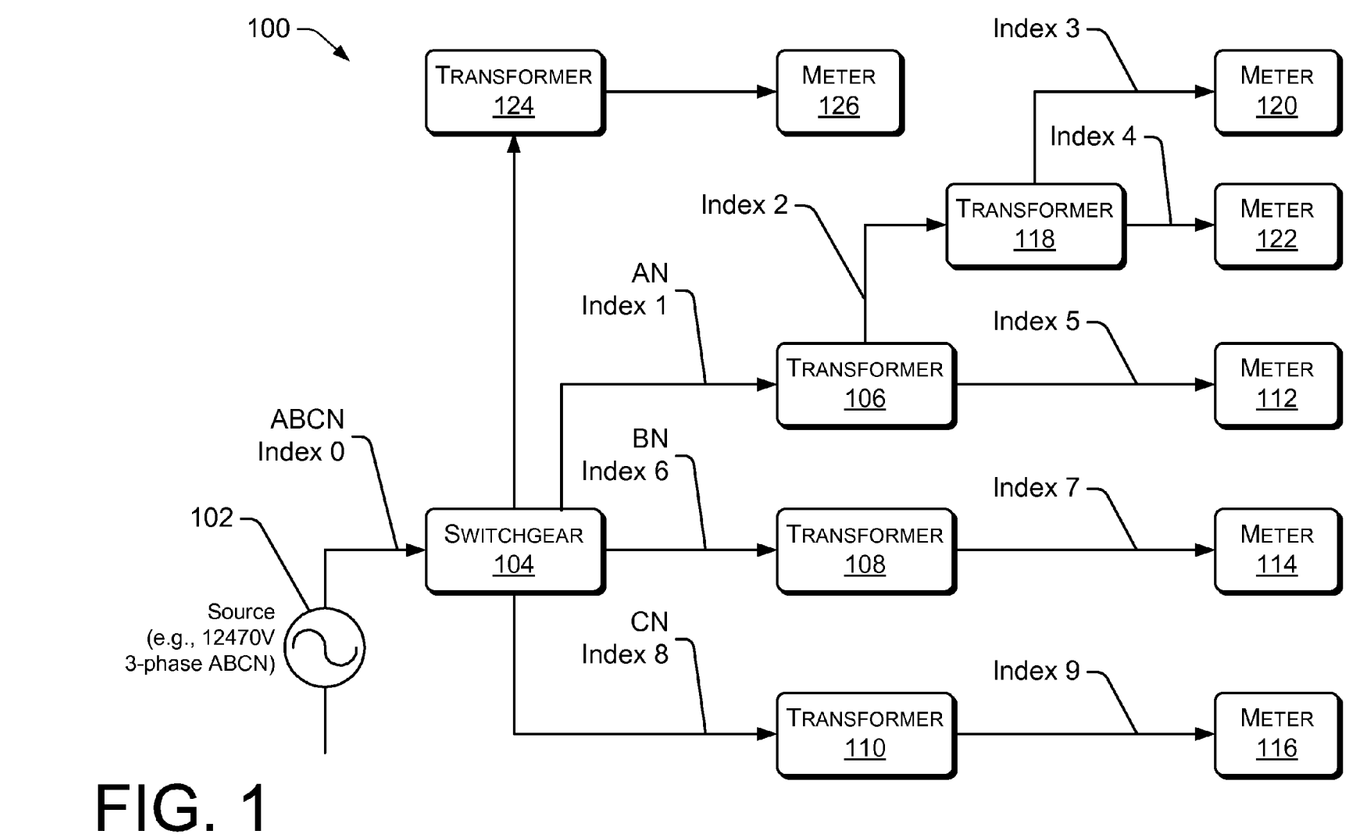
FIG. 1 is a diagram showing an example of circuit elements of an electric grid that may be sized according to electrical optimization techniques described herein.

FIG. 1 shows an example power distribution circuit 100, which may represent a possibly simplified portion of a distribution circuit and/or power grid. The example power distribution circuit 100 shows distribution of power from a source to end-users, represented by a plurality of meters that measure electrical consumption. The circuit 100 includes the power source, primary conductor, transformers and secondary conductor from the transformers to a plurality of meters at customer sites. The design of aspects of the distribution circuit may be performed according to a tool such as an electrical analysis module, and refined by operation of an optimization module within a computing system. In particular, the design process may select components, such as primary conductor, transformers and secondary conductor, having sizes and/or gauges that balance cost and design characteristics.

In the example power distribution circuit 100, a power source 102 provides 12,470 volt three-phase power (with ABC phase conductors and neutral N) to a switchgear 104 over a primary segment having label index 0. The switchgear 104 distributes one of the three phases to each of three transformers 106, 108 and 110, over primary conductor segments having labels index 1, 6 and 8, respectively. Transformer 106 provides power over a further single phase primary segment labeled index 2 to transformer 118.

In the example of FIG. 1, six primary segments form four unique paths from the source at 102 ending at each transformer 124, 118, 108 and 110, respectively. (The primary path does not end at the transformer at 106 because the primary conductor is fed through to the transformer at 118.) A voltage drop over each primary path must be less than a value specified by a design, which may be indicated by a standards authority. A first primary path includes three primary segments, including indexes 0, 1 and 2. A second primary path includes two primary segments, including indexes 0 and 6, while a third primary path includes two primary segments, including indexes 0 and 8. Other primary paths may be recognized by inspection of FIG. 1.

The voltage drops over primary paths can be expressed as the voltage drops across the primary segments making up each primary path. Three example voltage drops across three example primary paths may be expressed as:

$$VD_{path0,1,2} = VD_0 + VD_1 + VD_2; \quad \text{Equation 1}$$

$$VD_{path0,6} = VD_0 + VD_6; \text{ and} \quad \text{Equation 2}$$

$$VD_{path0,8} = VD_0 + VD_8, \quad \text{Equation 3}$$

where $VD_{path}$ is the voltage drop across the entire primary path and VD is the voltage drop across a segment within the path.

The transformers 106, 108, 110 and 118 provide power to customers represented by meters 112, 114, 116, 120 and 122. The power provided by the transformers is transmitted over secondary conductors indicated by indexes 3, 4, 5, 7 and 9. In one example, the power provided to the customers may be 120/240 volt single-phase power.

The switchgear 104 may optionally provide three-phase power to a transformer 124, for distribution to a three-phase customer having meter 126. Thus, the example distribution circuit 100 may include a mixed-phase environment, including both single-phase and three-phase power.

Example Electrical Optimization Module

Figure 2:
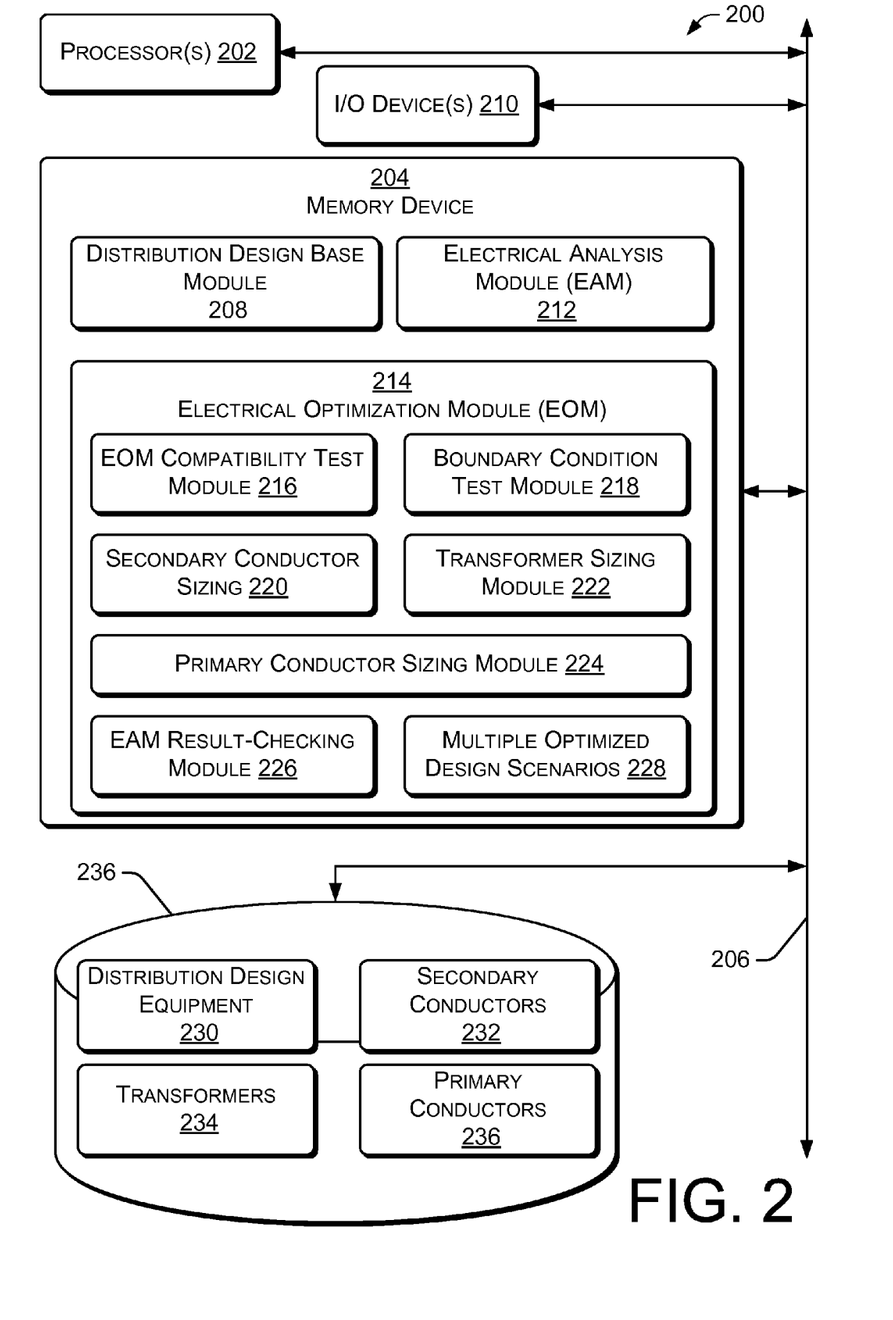
FIG. 2 is a block diagram showing a computing device configured with an example of an electrical optimization module.

FIG. 2 shows an example system 200 including an electrical analysis module 212 and an electrical optimization module 214. A distribution design base module 208 allows a user to create a basic electrical design. The electrical analysis module 212 may then provide an initial analysis of a power distribution circuit, which may comprise all or part of an electrical distribution grid. The electrical optimization module 214 may optimize the design, and select components that conform to design requirements, but which also reduce costs of construction of the power distribution circuit.

In one example, the system 200 is configured to optimize a design with single-phase and (optionally) three-phase power using a Thevenin equivalent circuit model. Additionally, a method for pre-sizing all primary conductor segments in the design allows determination of a voltage drop to each conductor segment, allowing selection of smaller and less expensive material for the design. In one option, if a designer wants to restrict the electrical analysis module to choose one size of conductor for each voltage level—perhaps because construction can more efficiently be managed by using a single wire size on a service truck—the system 200 may be directed to assign a single wire size (gauge) to primary conductor and/or secondary conductor of a particular voltage level. Additionally, the electrical optimization module may be configured to optimize an electrical design having multiple source points. This facilitates the ability to design for normal operating conditions as well as emergency-feed conditions, which may have a different set of equipment rating factors and which may provide electricity over different primary paths.

The example system 200 includes one or more processors 202, communicating with one or more memory devices 204 over a bus 206. A larger capacity memory device 236, such as a disk drive or remote "cloud" storage device may also be in communication with the processor 202. One or more I/O devices 210, such as keyboards, display screens, speaker systems and/or user interfaces may also be present.

The processor(s) 202 may execute, and the memory 204 may contain, various software statements, software modules, procedures, managers, algorithms, etc. Such functional blocks may be configured in software and/or firmware, and may be executable by the processor(s) 202. In alternative embodiments, any or all of the processor(s) 202, memory 204 and/or software operable on the processor(s) and memory may be implemented in whole or in part by hardware. Examples of hardware include a microcontroller or other digital device, such as an application specific integrated circuit (ASIC), gate array(s), or other device configured to execute the described functions.

The memory devices 204, 236 may comprise computer- and/or processor-readable media and may take the form of volatile memory, such as random access memory (RAM) or flash RAM, and/or non-volatile memory, such as read only memory (ROM). Computer-readable media includes volatile and non-volatile, removable and non-removable media implemented or instantiated in any device, method or technology for storage of information such as computer-readable instructions, data structures, program modules, or other data for execution by one or more processors of a computing device. Examples of computer-readable media include, but are not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. As defined herein, computer-readable media does not include transitory media, such as modulated data signals and carrier waves.

An electrical analysis module 212 may be included in the memory device 204. The electrical analysis module 212 may be configured to execute one or more algorithms to assist in the analysis of a design or layout of a power distribution circuit. However, the resulting circuit may not be optimized, (various components may be more expensive than would be required) and may not meet the demands of the electric network (not conforming to standards of voltage drop, flicker, transformer utilization, etc).

An electrical optimization module 214 may be included in the memory device 204. In one example, electrical optimization module 214 may be configured to find the least quantity of electric equipment and/or the least expensive electric equipment that will meet the electrical requirements for the design provided. The electrical optimization module 214 may also be configured to adjust non-electric equipment as necessary based on electric equipment selections (e.g., change conduit for conductors or elbows for transformers, etc.). The electrical optimization module 214 may also be configured to allow a user to designate specific material not to optimize Such material may be considered "fixed," for example, the material may already be operation in the grid (not to be replaced) or the material may be available at no cost from other projects, or the material may be "fixed" for reasons such as permitting, zoning, etc.

The electrical optimization module 214 may be configured to operate according to a number of rules or constraints. Rules, such as the examples indicated below, may be imposed on algorithms and/or methods operating within the module. A first example rule indicates that the size of the conductor should not be increased downstream to be larger than the proceeding (upstream, i.e., closer to the source) conductor. That is, larger conductors (e.g., those with less impedance and/or smaller voltage loss per unit distance) are used nearer to the source and that smaller and less expensive conductors may be used closer to the end consumer (e.g., the utility meter).

A second example rule is to size each conductor in a three phase conductor in the same electric branch and the same trench be the same size. Accordingly, the electrical optimization module (EOM) 214 may indicate same-size conductors for all phases in the conductor path so they will be sized to the largest required for any one phase.

A third example rule allows the user to add constraints to the design. In one example, the user may label equipment that should not be modified by the optimization process. For example, if equipment is labeled as "existing," "installed" or "fixed," then it will not be modified by the EOM 214.

A fourth example rule allows the user to choose to use only the same size primary conductor (so as to take only one size wire for a given job). A fifth example rule allows the same choice for secondary conductors.

A sixth example rule allows the user to determine if they will allow multiple parallel runs of secondary conductor to create the optimized solution. Occasionally for especially long secondary conductor segments or those serving high demand loads, the utility does not stock large enough conductors to support the design and they may choose to run multiple wires in parallel to reduce the total load per wire. This is optional, as some utilities prefer to redesign the circuit rather than running parallel wires. When using this option, the user may configure how many parallel wires they will allow in a circuit.

The electrical optimization module 214 may be associated with a number of modules that perform optimization-related functions. In the example of FIG. 2, these modules include: an electrical optimization module (EOM) compatibility test module 216; a boundary condition test module (EAM) 218; a secondary conductor sizing module 220; a transformer sizing module 222; a primary conductor sizing module 224; and an EAM result-checking module 226. The modules 216-226 may be internal or external with respect to the electrical optimization module 214. For example, the modules 216-226 may be called by the electrical optimization module 214 as subroutines.

The EOM compatibility test module 216 may be configured to check a design (e.g., a design for the power distribution circuit 100 of FIG. 1) to confirm that it is compatible with the electrical optimization module 214. In the event that compatibility is lacking, the EOM compatibility module 216 may send the user a message (e.g., through I/O 210) indicating that a compatibility issue exists.

The boundary condition test module 218 may be configured to determine if there is a combination of conductors and transformers that will be able to satisfy the load indicated by a design provided by the EAM 212. In one example, this determination may be made, and starting data created for the EOM 214, by sizing the secondary conductors and sizing the transformers to a largest equipment size that is allowable. If the EAM 212 indicates that there are errors in voltage drop, transformer utilization, conductor utilization or flicker under these characteristics, then there may be no solution for that particular design and it may require redesign. The EOM 214 may be configured to return the design with the largest equipment and the EAM results for this design so as to display the potential failure points to the designer.

The secondary conductor sizing module 220 may be configured to establish a minimum size of secondary conductor in the design. While primary conductors extend from the substation to transformers, secondary conductors extend from transformers to the utility customers. The minimum size of the secondary wiring includes a gauge of wire used in each secondary segment. The secondary wire size is calculated using a total of the current required for each span, including coincidental loads (total individual demand reduced by diversity factors which account for the fact that all customers do not require peak power simultaneously), and using one or more analysis conditions (e.g., extremes of weather, etc.). The calculation may indicate a lowest-cost conductor with the smallest ampacity per analysis condition that is greater than the calculated current.

The transformer sizing module 222 may be configured to establish a minimum size of transformers within the design. In one example, the transformer sizing module 222 will determine the minimum size of each transformer using the total coincidental load per analysis condition at each transformer location compared against the allowable KVA for each analysis condition.

The primary conductor sizing module 224 may run the EAM 212 using pre-sized secondary conductor and transformers and default spotted primary conductor as input. In response, the EAM 212 will provide or set an estimated current per primary segment. The primary conductor sizing module 224 may establish a minimum size of the primary conductor by calculating an approximate voltage drop across each primary conductor segment based on a total allowable primary voltage drop. The operation of the primary conductor sizing module 224 will be developed further in the discussion of FIGS. 3-6.

The EAM result-checking module 226 may check the design for any voltage drop, flicker, conductor utilization or transformer utilization errors, modify equipment as necessary to find the least cost solution.

Multiple optimized design scenarios 228 may be stored, each design scenario related based on demand conditions, source conditions or other factors. Demand conditions may be based on weather, such as summer or winter weather and related utility usages. Source conditions may be based on one or more particular sources (e.g., substations) that may be utilized. The multiple design scenarios 228 may be used to confirm the validity of a particular design.

During operation, the electrical analysis module 212 and/or the electrical optimization module 214 may access information about components available for inclusion in a design of a power distribution circuit (e.g., circuit 100 of FIG. 1). In the example of FIG. 2, several example libraries of component information are shown. The libraries include distribution design equipment 230 (such as conduit, elbows, structures, meters, etc), a secondary conductor library 232, a transformer library 234 and a primary conductor library 236. Such libraries may contain information and/or specifications of available components, such as wire gauges and transformer sizes. Such libraries may have equipment groups to restrict which type of material may be replaced for a like material (e.g., only transformer cans designed for corrosive weather conditions should be used to replace other such transformers and only conductor in conduit should be used when replacing other conductor in conduit material).

Example Methods

The example methods of FIGS. 3-7 may be implemented at least in part by the system of FIG. 2. However, FIGS. 3-7 contain general applicability, and are not limited by other drawing figures and/or prior discussion. Each method described herein is illustrated as a collection of acts, blocks or operations in a logical flow graph, which represent a sequence of operations that can be implemented in hardware, software, or a combination thereof. In the context of software, the operations represent computer-executable instructions that may be stored in a non-transitory manner on one or more computer-readable storage media. When executed by one or more processors, the instructions may perform the recited operations discussed in the methods. Such storage media and computer-readable instructions can be executed by a processor, microprocessor, controller, etc., (e.g., processor 202 of FIG. 2), according to a desired design or implementation. The storage media seen in FIG. 2 is representative of non-transitory storage media generally, both removable and non-removable, and of any technology. Thus, the recited operations represent actions, such as those described in 3-7, and are taken under control of one or more processors configured with executable instructions to perform actions indicated. Generally, computer-executable instructions include routines, programs, objects, components, data structures, and the like that perform particular functions or implement particular abstract data types. The order in which the operations are described is not intended to be construed as a limitation, and the described operations may be combined in different orders and/or in parallel to implement the method. The above discussion may apply to other methods described herein.

Example Primary Conductor Sizing

Figure 3:
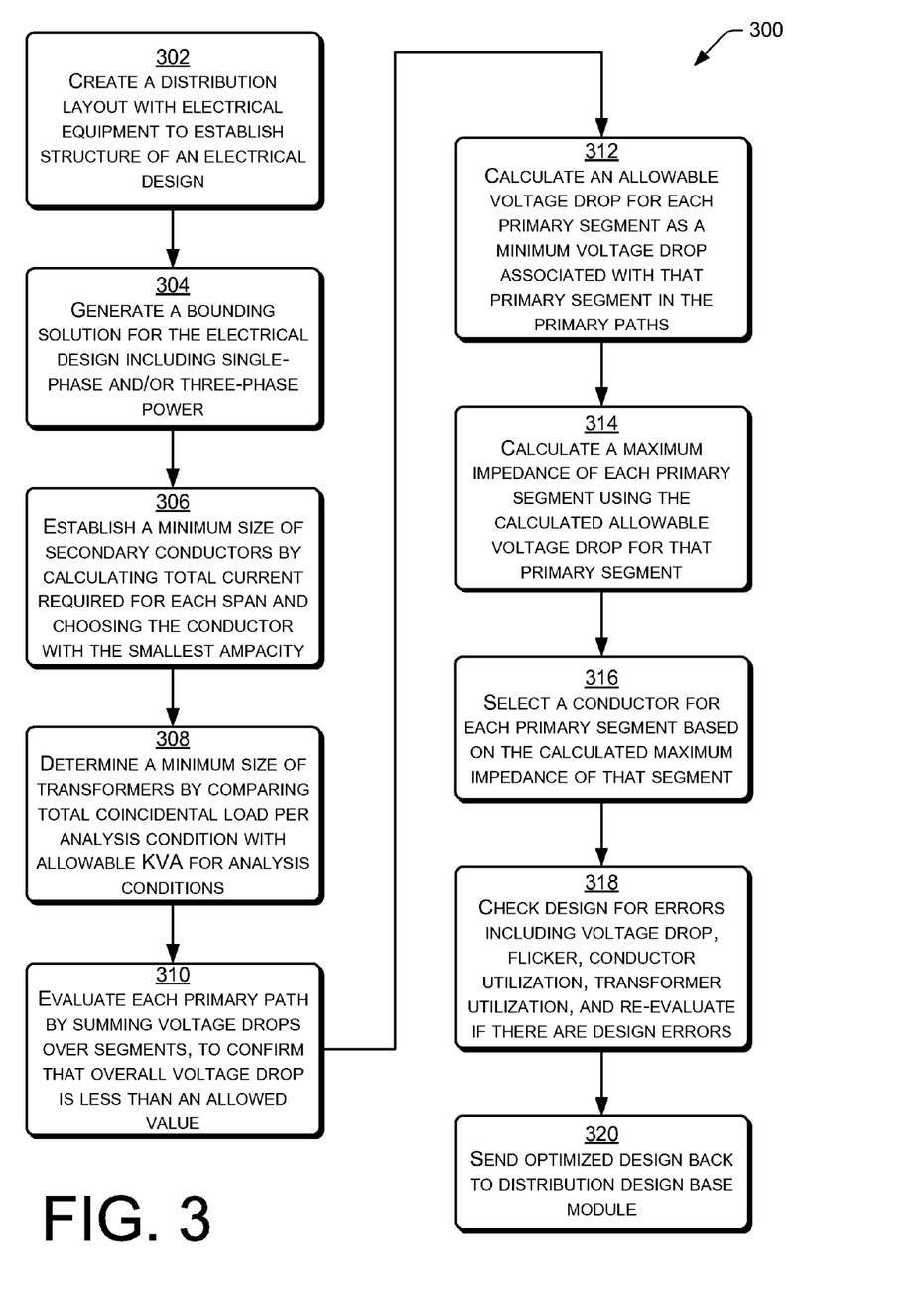
FIG. 3 is flow diagram showing an example of the operation of an electrical optimization module.

FIG. 3 is flow diagram showing an example method 300 illustrating the operation of an electrical optimization module. The method 300 includes an example process by which a gauge (wire size) of the primary conductors may be selected. The gauge of the wire is important because gauge determines impedance, which is a factor that determines the voltage drop of each primary segment. Moreover, the voltage drop over each primary path is composed of voltage drops over one or more constituent primary segments, and must be less than a prescribed maximum.

The primary wiring of a distribution circuit may comprise a plurality of unique primary paths, each primary path leading from a source (e.g., a substation) to an end (e.g., a transformer). Each primary path may include a plurality of primary segments, and each primary segment may be in one or more primary paths. For example, one primary segment may end and two primary segments may branch from that location. Such branching may be required to service two differently located transformers. The two branching primary segments are each in one or more distinct (i.e., unique) paths (e.g., paths leading to each of the two differently located transformers). Because the voltage drop across each primary path must be less than a prescribed maximum, the sum of the voltage drops across each primary segment in that primary path must also be less than the prescribed maximum. Accordingly, each primary segment must be constructed of wiring of a gauge that results in the primary path having less than the required maximum allowed voltage drop.

At operation 302, a user creates a distribution layout with electrical equipment to establish the structure of an electrical design. The electrical design may resemble FIG. 1, with greater or lesser complexity. At operation 304, a bounding solution to a distribution system is generated. The bounding solution may include and/or be based on single-phase power or a combination of single-phase and three-phase power. For example, the system may include some customers that receive only single-phase power, while other customers receive both single-phase power and also three-phase power. Moreover, for any design there is no guarantee that there is a combination of conductors and transformers that will be able to satisfy the load. For this reason, and to generate starting data for sizing the secondary and transformers, an initial analysis or starting solution may be run (i.e., simulated on an electrical analysis module 212). The starting solution may be configured with the largest equipment allowable to determine if there is a possible solution. For example, the largest conductors and transformers may be specified. If there are any errors in voltage drop, transformer utilization, conductor utilization or flicker using the largest possible equipment, then there is no solution to the design. In such circumstances, the electrical optimization module (e.g., EOM 214 of FIG. 2) may return the design with the largest equipment and the results of the electrical analysis for the design (e.g., as performed by the EAM 212 of FIG. 2).

In one example, the starting solution to an electrical distribution system generated by operation 302 may include secondary conductors sized based on anticipated loads and/or to the largest equipment available. The starting solution may include single-phase only, or a mixed-phase solution including both single-phase and three-phase power. The starting solution may be based on a length of each secondary segment, which may be received from a design by the EAM 212 of FIG. 2. The impedance may be determined for each secondary segment based on the received length, a current phase and a load. Secondary conductors may then be selected based on the smallest ampacity consistent with the determined impedance. The starting solution may be checked for errors in voltage drops, transformer utilization conductor utilization and flicker. An indication may be provided to user(s) in response to any error indicated by the checking.

At operation 306, a minimum size of secondary conductors (generally, the conductors between the transformers and the utility customers) is established by calculating a total current required for each span and choosing the conductor with the smallest ampacity. In the example of FIG. 2, this may be performed by the secondary sizing module 220. The minimum size of the secondary conductor may be established by calculating the total current required for each span of secondary conductors, such as by using the coincidental loads for each analysis condition (e.g., analysis conditions may correspond to different weather conditions, which may result in different loads). A conductor may be selected that has the smallest ampacity per analysis condition greater than the calculated current. If a plurality of such conductors is available, the conductor with the least cost may be selected.

At operation 308, a minimum size of transformers is determined. In one example, the size is determined using a total coincidental load per analysis condition (e.g., extremes in weather). These value(s) may be compared against an allowable KVA (kilo volt amps) for the analysis conditions. In the example of FIG. 2, this may be performed by the transformer sizing module 222.

Operations 310-316 involve primary conductors. In the example of FIG. 2, such sizing may be performed by the primary conductor sizing module 224. At operation 310, each primary path is evaluated by summing voltage drops over primary segments. The evaluation may confirm that the overall voltage drop over the primary path is less than an allowed value. In one example, the allowed value is a design constraint, and may be imposed by a utility company and/or standards, regulations, government, etc.

At operation 312, an allowable voltage drop for each primary segment is calculated. In one example, the allowable voltage drop for each primary segment is set as a minimum voltage drop associated with that primary segment in the primary paths. Thus, a segment may be examined in each of a plurality of primary paths. In each primary path, that segment will have an assigned maximum voltage drop, which when summed with voltage drops across other primary segments, demonstrates that the voltage drop across the primary path is less than an allowed value. By comparing the maximum voltage drop for that primary segment in the plurality of primary paths, the lowest voltage drop for that primary segment in the plurality of primary paths may be found, and assigned to that primary segment. The discussion of FIG. 5 develops this selection process further.

At operation 314, a maximum impedance of each primary segment may be calculated. The maximum impedance may be calculated using the calculated allowable voltage drop for that primary segment found at operation 310.

At operation 316, a conductor may be selected for each primary segment based on the calculated maximum impedance of that segment. For example, every conductor will have a known impedance value, and a conductor having an impedance that is less than or equal to the maximum impedance value may be selected.

At operation 318, the design may be checked for errors, including voltage drop, flicker, conductor utilization, and transformer utilization. Depending on the results of the check, the design may require re-evaluation. The design may be considered the starting solution to a distribution system, together with any substitutions or modifications (e.g., substitution of the selected primary conductor segments) that were indicated by the calculations in the operations performed. In the example of FIG. 2, the check of the design may be performed by the EAM result-checking module 226.

At operation 320, the optimized design may be utilized as desired. In one example, the optimized design is sent back to a distribution design base module.

Figure 4:
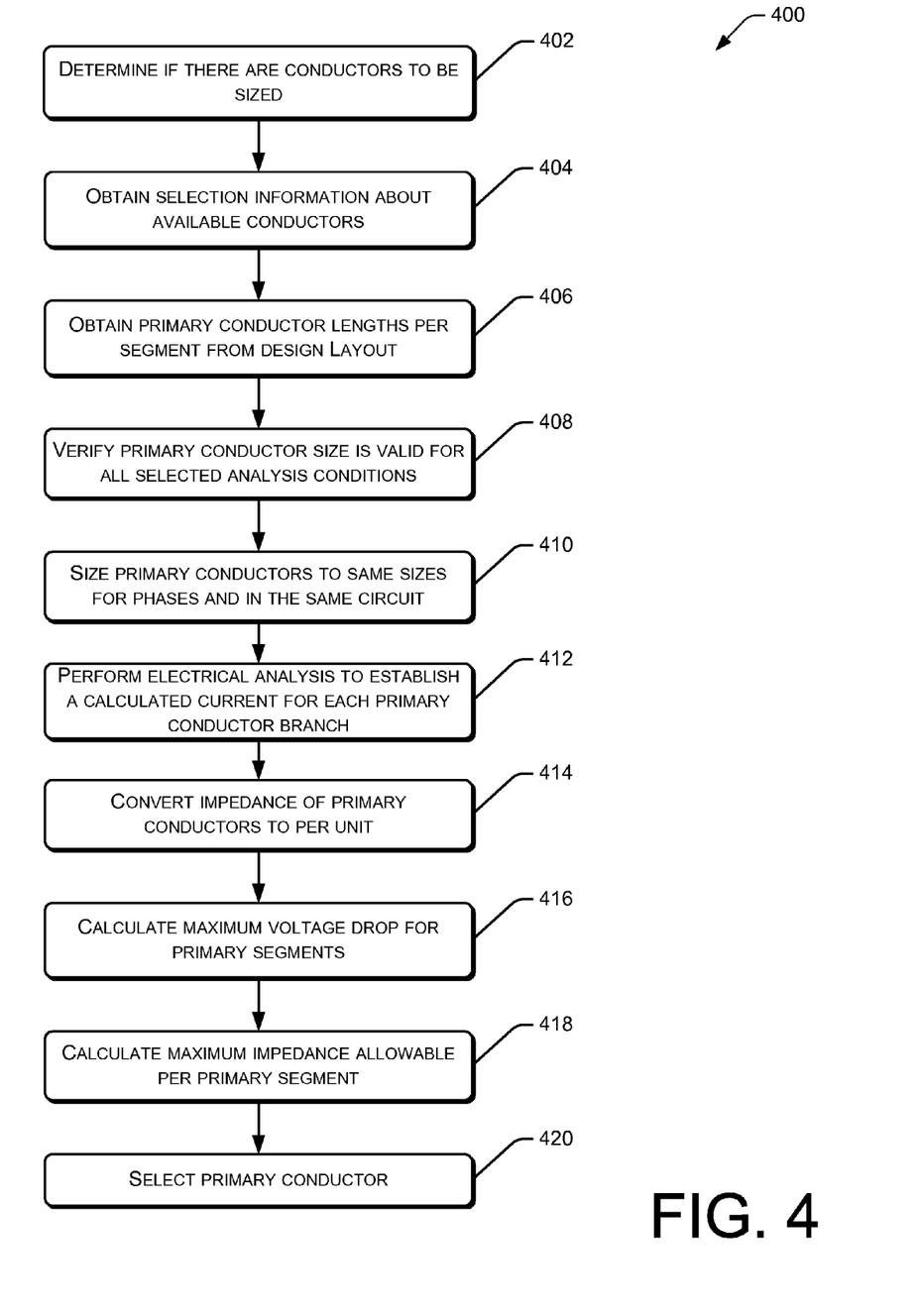
FIG. 4 is a flow diagram showing an example of how primary conductors may be sized for use in an electrical distribution circuit.

FIG. 4 is a flow diagram showing an example method 400 of how primary conductors may be sized for use in an electrical distribution circuit. The method 400 may be performed by a system and/or electrical optimization module, such as the EOM 214 of FIG. 2. The example method 400 may include an expansion of detail regarding the calculation of primary segment voltage drops, primary segment impedance and primary segment conductor gauge discussed at operations 310-316 in FIG. 3.

At operation 402, a system (e.g., the system of 200 of FIG. 2) determines if there are primary conductors to be sized. In some installations, an electrical utility company may require the use of a single conductor size and/or gauge of conductor in all primary segments used in a voltage level within the primary portion of the distribution system. This means that primary segments within portions of a primary path that are at a same voltage level may be constrained to be the same wire gauge. This may be practical, if the particular conductor size is what is in inventory or to reduce the number of wires to haul on-site. In other installations, portions of a distribution grid and/or system may already have been constructed (thereby "fixing" those portions of the grid). In circumstances that constrain the electrical optimizing module to select a particular conductor for each primary segment, the selection may also be based on a confirmation of the acceptability of the calculated maximum impedance of that segment. That is, the required conductor must not result in unacceptable voltage drops on primary path(s).

At operation 404, information is obtained about available conductors. This may involve finding what conductors are available in inventory or available for order. This may also involve the selection of similar conductors (conductor in conduit CIC, conductor with concentric neutral, triplex conductor (3 twisted wires) compared to 3 individual wires). It would not serve the design to choose a conductor that does not have matching design criteria.

At operation 406, the length of each primary segment is obtained. Each primary path may begin at a source of power and may continue to a transformer serving one or more customers. The primary path may include one or more primary segments. Each primary segment may begin at the power source or a branch in the primary path and continue until reaching a further branch or the path end at a transformer. The length of each primary segment is therefore known, due to the geometry, geography and/or map of the primary runs and the primary segments within those runs.

At operation 408, the system may verify that the primary conductor size is valid for all selected analysis conditions. Such verification may involve a simulation of the demand under the selected analysis conditions, which may be performed by an electrical analysis module, such as EAM 212 of FIG. 2.

At operation 410, primary multi-phased conductors in the same circuit are sized appropriately to have the same impedance for each segment. For example, all phases in a three-phase circuit would be sized the same for a given primary segment.

At operation 412, an electrical analysis may be performed. The analysis may be performed by an electrical analysis module, such as EAM 212 of FIG. 2. This step may generate a calculated current for all primary segments to be used later, e.g., in operation 416.

At operation 414, impedance of available primary conductors may be converted to per unit values. In order to have the correct impedance to use for comparison purposes later, the impedance of all possible primary conductors may be converted or expressed in per unit values. It is often useful for electrical data to be expressed in per unit or percentage values to eliminate the need for conversions between voltage levels. To express impedance (Z) in per unit value, a base impedance (Zbase) may be assigned for all design segments and the per unit impedance may be calculated using Zbase. For example, for each primary conductor segment, the Zbase may be found in an analysis engine (e.g., the EAM 212). For all of the available primary conductors in that segment, take the Zconductor from the database and divide by Zbase. This value may be saved for future calculations. For example:

$$Z_{cond\,pu} = Z_{cond}/Z_{base}. \qquad \text{Equation 4}$$

The magnitude of the impedance in per unit may be taken for all of the available primary conductors. This value will be used for comparison. For example, the magnitude may be expressed as:

$$|Z_{cond\,pu}|. \qquad \text{Equation 5}$$

At operation 416, the maximum voltage drop for primary segments may be calculated. In one example, the allowable voltage drop in each primary segment may be calculated by using the calculated current to determine the approximate percentage of drop per segment. The voltage drop may then be used to calculate the maximum allowed impedance for a conductor. Since the voltage drop formula in its long form is the sum of the voltage drop in each primary path from the source to the end, the calculated currents in each primary segment may be used as a starting approximation of the currents. By using the calculated currents, a more accurate allocation of voltage drop may be calculated when there are branches and each primary branch may have a different current to serve the downstream loads. Thus, the voltage drop across a primary path may be expressed as:

$$VD_{tot} = VD_1 + VD_2 + VD_3 + \ldots + VD_n \qquad \text{Equation 6}$$

where $VD_{tot}$ is the total voltage drop from the source to the end of any path of primary conductor having n segments. Every primary branch will create another primary path to check from source to end. Moreover, different primary segments may pass different amounts of current to serve a variety of customer loading needs.

Using the current and conductor impedance per foot (or other unit of distance) this formula in long form is:

$$VD_{tot} = L_1*I_1*Z_1 + L_2*I_2*Z_2 + L_3*I_3*Z_3 + \ldots + L_n*I_n*Z_n. \qquad \text{Equation 7}$$

where subscript 1-n correspond to the each primary conductor segment;

where I is the assumed current calculated by running EAM; and where L is the length of the primary conductor segment.

Z is the impedance of conductor per unit length in per unit. For any one segment the voltage drop is:

$$VD_1 = L_1*I_1*Z_1. \qquad \text{Equation 8}$$

To determine the percentage of drop in each segment compared to the whole path:

$$\% VD_1 = VD_1/VD_{tot}; \qquad \text{Equation 9}$$

and therefore, $$\% VD_1 = L_1*I_1*Z_1/L_1*I_1*Z_1 + L_2*I_2*Z_2 + \ldots \pm L_n*I_n*Z_n. \qquad \text{Equation 10}$$

Assuming the same impedance in all segments of primary conductor this reduces to:

$$\% VD_1 = L_1*I_1/L_1*I_1 + L_2*I_2 + \ldots + L_n*I_n. \qquad \text{Equation 11}$$

If the percent drop for each segment is known, then it can be multiplied by the total allowable voltage drop to determine the max voltage drop per segment.

$$VD_{1max} = \% VD_1 * VD_{AP}; \text{ or} \qquad \text{Equation 12}$$

$$VD_{1max} = VD_{AP}*(L_1*I_1/(L_1*I_1 + L_2*I_2 + \ldots + L_n*I_n)), \qquad \text{Equation 13}$$

where $VD_D$ is the allowable primary voltage drop for the entire primary path.

The calculations for voltage drop for primary segments may include some assumptions that may affect the overall results. For example, the current used to set the voltage drop may be based on the calculated current with the starting primary conductor. The calculated current will vary when the final primary conductors are selected. However, this assumption is mitigated because the primary current will only vary slightly since the primary conductors have a small impact on the total current. Assuming that the primary conductor will be the same in each branch allows a determination of the percentage of voltage drop in each segment compared to the total voltage drop in the complete primary line using the calculated current with the default conductor. Knowing the percentage of drop in each segment allows extrapolation of the maximum allowable voltage drop in each segment from the total allowable voltage drop. In some implementations, some limitations may be present. If there are different primary conductors in some of the segments, the current ratios implied by the calculation may be off slightly which will cause the calculated voltage drop per segment to vary slightly.

At operation 418, the maximum impedance that is allowable per primary segment is calculated. This calculation is discussed with respect to FIG. 5.

At operation 420, a primary conductor is selected. For example, a specific gauge of primary conductor is selected. This calculation is discussed with respect to FIG. 6.

Figure 5:
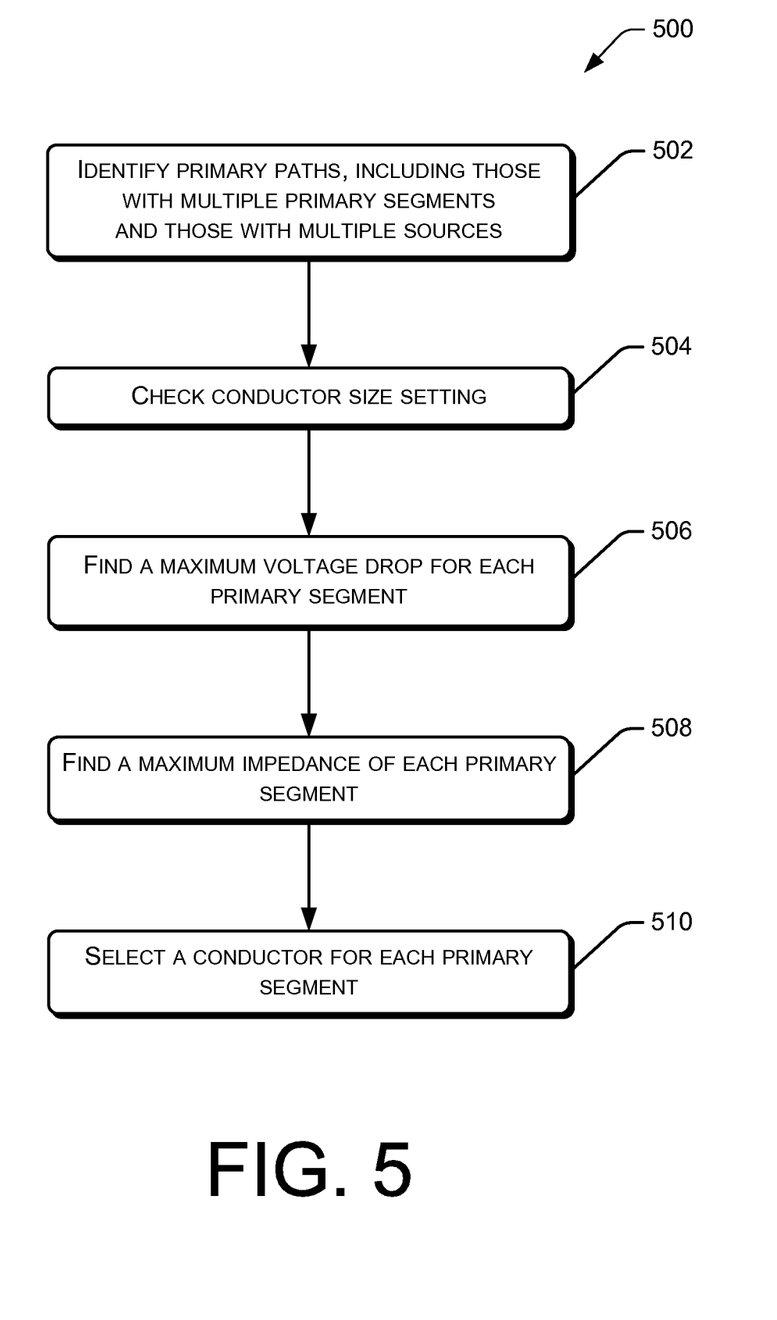
FIG. 5 is a flow diagram showing an example of how impedance may be calculated for primary segments of primary paths within the electrical distribution circuit.

FIG. 5 is a flow diagram showing an example method 500 of how impedance may be calculated for primary segments of primary paths within the electrical distribution circuit. The method 500 may be performed by a system and/or electrical optimization module, such as the EOM 214 of FIG. 2. The example method 500 may include detail regarding the calculation of maximum impedance allowable per primary segment discussed at operations 418 in FIG. 4.

At operation 502, primary paths are identified. Each primary path may be associated with a source point and may each have multiple primary segments between the source and a transformer. Because distribution transformers outnumber substation (transformers), a typical primary path from a substation to a distribution transformer involves some branching. And because each branch terminates one primary segment and may start two or more new primary segments, it is typical for primary paths to include a number of primary segments. Referring to the example of FIG. 1, an example primary path includes primary segments labeled Indexes 0, 1 and 2. A different primary path includes primary segments labeled Indexes 0 and 6. Notice that branching occurs at the switch 104 and at transformers 106 and 118. For example, at transformer 106, Index 1 enters the transformer, and Indexes 2 and 5 exit the transformer. Thus, at operation 502, a number of primary paths may be identified, which are associated with the layout or grid under development.

The identified primary paths in the distribution system (i.e., the electrical grid distributing electricity) may include a primary path from one source point that provides power under typical conditions to a particular transformer through a particular primary path. However, a different source point may provide power to the particular transformer through a different primary path—which should also be identified—under other conditions (emergencies or network maintenance) may require serving some loads from normally open points to maintain reliability.

In a further example, a formula is created for the total voltage drop in every primary conductor path, including runs of primary conductor from one or more source points. Each straight line path from a source to an end of the primary conductor (e.g., at a transformer) may be defined as one path. Each path may be evaluated separately for voltage drop as a part of separate and/or iterative processes to prevent each independent path from exceeding the allowable voltage drop associated with that path. Additionally, all voltage drop and impedance calculations may be performed per analysis condition (e.g., load condition) and per phase. In one example, the voltage drop across a primary path may be expressed as a sum of voltage drops across a plurality of primary segments that make up the primary path, such as:

$$VD_{path1} = VD_{seg1} + VD_{seg1} + VD_{seg2} + \ldots + VD_{segN}$$ Equation 14 where voltage drops across all primary conductors segments are summed from the source (e.g., at a substation or primary equipment branch) to the end of the primary run (e.g., at a service transformer).

Figure 6:
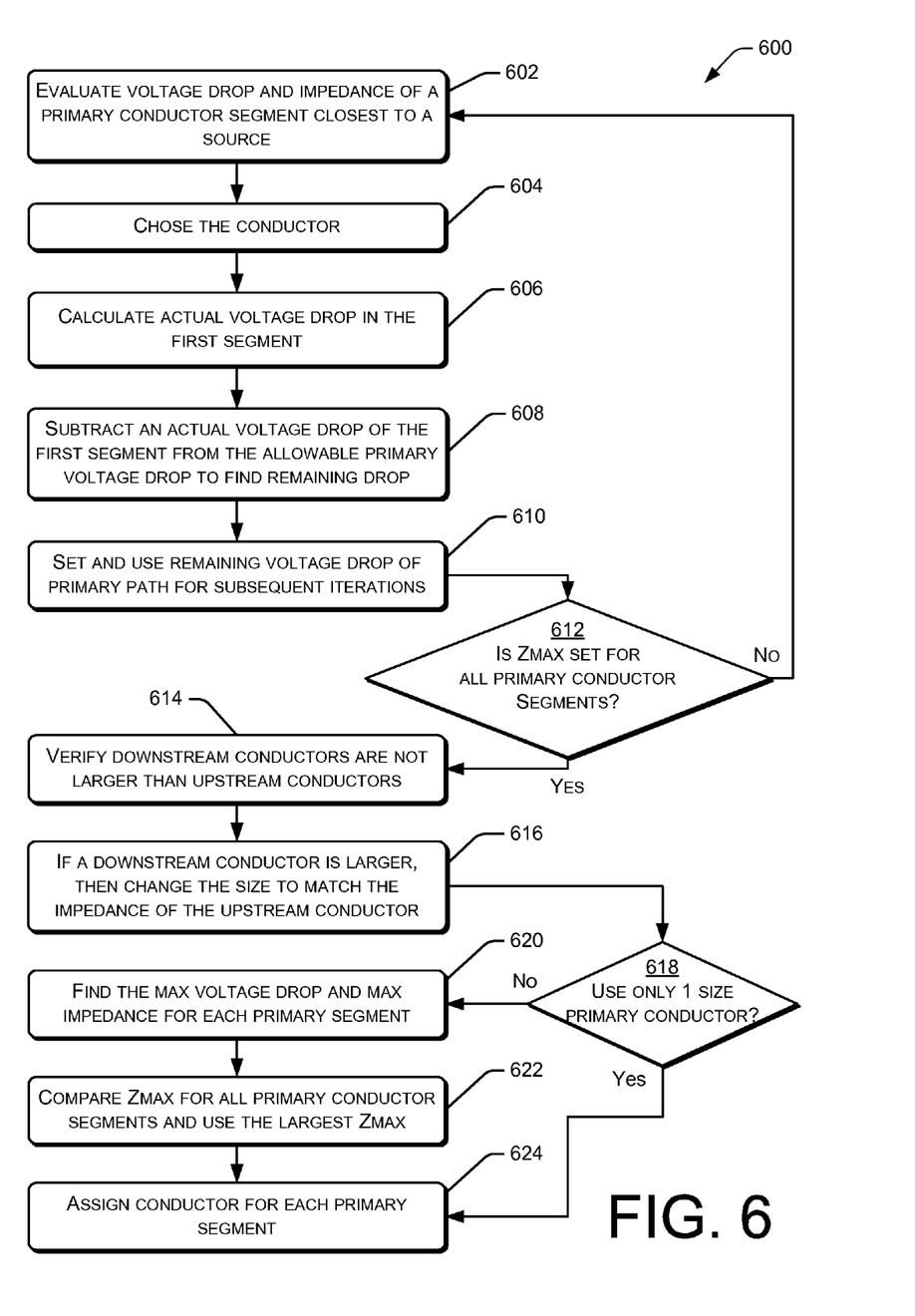
FIG. 6 is a flow diagram showing an example of selection of wire gauges for primary conductors in an electrical distribution circuit.

At operation 504, a conductor size setting and/or selection is checked. In one example, if the user allows the primary conductor to change from one run to the next, then only the maximum voltage drop for the segment closest to the source (s) is found. This value may be used to reevaluate the subsequent primary segments. FIG. 6 provides additional information about this example.

At operation 506, a maximum voltage for each primary segment is found. In one example, a maximum voltage drop is calculated for each primary path. How much voltage one primary segment can drop may be determined by the maximum voltage drop each path uses, the maximum allowable voltage, the calculated current and the length of each conductor segment. For any particular segment, the voltage drop for that segment may be checked in every primary path. The voltage drop for the primary path is then calculated to be:

$$VD_{XmaxPathY} = VD_{AP} * (L_X * I_X / (L_X * I_X + L_2 * I_2 + \ldots + L_n * I_n).$$ Equation 15

The maximum voltage drop of a particular primary segment may be determined by examination of that segment in all paths. In particular, the maximum voltage drop of that primary segment in each primary path that includes that particular primary segment is reviewed. Then, the smallest maximum voltage drop value is selected as the limiting condition for that primary segment in each phase (e.g., a phase of three-phase power). This selection process may be expressed as:

$$VD_{XmaxPath} = \text{smallest of } (VD_{XmaxPath1}, VD_{XmaxPath2}, \ldots, VD_{XmaxPathN})$$ Equation 16 per phase (i.e., for each phase), where X is the particular primary segment at issue.

The maximum voltage drop may be examined for all phases. A constraint may be imposed to require that the optimization engine use the same conductor for all phases. In this circumstance, all phases may be compared and the smallest max voltage drop of each of the phases may be selected as the limiting condition. This may be expressed as:

$$VD_{Xmax} = \text{smallest of } VD_{XmaxA}, VD_{XmaxB}, VD_{XmaxC}$$ Equation 17 where A, B and C are phases (e.g., of three-phase power).

At operation 508, a maximum impedance is found for each primary segment. In one example, the maximum impedance per unit length of each segment may be calculated for each segment according to:

$$Z_{Xmax} = VD_{Xmax} / (I_X * L_X)$$ Equation 18 where X corresponds to the specific primary conductor segment;
where $I_X$ is the assumed current calculated by running EAM; and
where $L_X$ is the length of the primary conductor segment.

At operation 510, a conductor may be selected for each segment. In one example, the selection process could include reducing a list of possible conductors to those that have the magnitude of impedance per unit length less than $Z_{max}$ for every primary conductor segment. This list of possible conductors may be maintained for each segment for future use. The conductors available for selection would be those for which it was true that:

$$|Z_{cond\,pu}| < |Z_{max}|. \quad \text{Equation 19}$$

However, if no conductors are available that meet this requirement, then a largest available conductor (i.e., a conductor with the smallest impedance) may be selected. The primary voltage drop may go below the minimum sizing value, but this is permissible if the rest of the solution is valid, i.e., if the overall solution is valid despite use of a conductor that does not meet the primary voltage drop parameter. The selected conductor may be assigned to the primary conductor segment for every phase and wire in the circuit. In a possible variation of the example, a user setting may be checked to see if the user wants to solve for the least cost solution. If so, then the least cost primary conductor is selected from the allowable list of each segment to use in the starting analysis test. Sometimes a larger conductor may be less expensive for a particular utility by purchasing a larger volume. Otherwise, the largest impedance (smallest gauge) conductor is selected from the reduced list.

FIG. 6 is a flow diagram showing an example method 600 of selection of wire gauges for primary conductors in an electrical distribution circuit. The method 600 may be performed by a system and/or electrical optimization module, such as the EOM 214 of FIG. 2. The example method 600 may include detail regarding the calculation of maximum impedance allowable per primary segment discussed at operations 420 in FIGS. 4 and 510 in FIG. 5.

At operation 602, a voltage drop and impedance of the primary conductor segment closest to the source (i.e., a "first" primary segment) is evaluated. In one example, the voltage drop and impedance may be evaluated by operations similar to operations 506 and 508 of FIG. 5.

At operation 604, a conductor is selected for the primary segment closest to the source. In one example, the voltage drop and impedance may be evaluated by an operation similar to operation 510 of FIG. 5.

At operation 606, an actual voltage drop in the first segment is calculated. (If the conductor we choose has less impedance than $Z_{max}$, the amount of voltage drop in conductor run n will be less than estimated which means the subsequent spans could have more voltage drop and use smaller conductors.) The voltage drop across primary segment X may be defined as:

$$VD_X = I_{Xpu} * Z_{Xpu} \quad \text{Equation 20}$$

where $I_X$=current of segment in per unit; and
where $Z_X$=impedance of selected conductor in per unit.

At operation 608, an actual voltage drop of the first segment is subtracted from the allowable primary voltage drop to find remaining drop, i.e., the voltage that may drop across primary segment(s) after the first segment. The remaining primary conductors in the path can utilize a voltage drop defined by:

$$VD_{remaining} = VD_{AP} - VD_X. \quad \text{Equation 21}$$

At operation 610, the remaining voltage drop is set and used for subsequent iterations. Each subsequent iteration assigns a voltage drop to a primary segment that is closest to the source (that has not previously been evaluated). Set the $VD_{remaining}$ as the new $VD_{AP}$ to be used for subsequent iterations.

At operation 612, the process is repeated until a value of $Z_{max}$ (i.e., a maximum allowable impedance) is set for all primary conductor segments. Thus, starting with the primary segment closest to the source (of power) and continuing outwardly (e.g., toward the transformer) each primary segment is assigned a maximum allowable impedance.

At operation 614, it is verified that the downstream conductors are not larger (i.e., lower impedance) than an upstream conductor. At operation 616, the size of the downstream conductor may be changed to match the impedance of the upstream conductor. In one example, with both normal and emergency sources, the verification process may include one complete loop from a normal source to an emergency source. In this example, all of the primary conductors may be assigned the same size and/or impedance. To reduce the number of permutations for primary conductor calculations, the design may be checked for this loop condition and the loop treated separately to find the minimum impedance.

At operation 618, it is determined if the user has directed that only one size of primary conductor is to be used. In some cases, the user may direct the use of one size of primary conductor for business or other reasons (e.g., cost, logistics, availability, etc.). If the user has directed the use of only one size of conductor, then that size is assigned at operation 624.

However, if more than one size of primary conductor is allowed, then at operation 620, a maximum voltage drop and a maximum impedance may be found for every primary segment. In one example, this may be performed according to operations 506 and 508 in FIG. 5, respectively.

At operation 622, the $Z_{max}$ of all primary conductor segments may be compared. The largest calculated $Z_{max}$ of any primary segment may be used for all conductor runs. In one example, the calculation can be defined as:

$$Z_{max} = \text{largest of } (Z_{max1}, Z_{max2}, Z_{max2}, \ldots Z_{maxN}). \quad \text{Equation 22}$$

At operation 624, the conductors may be selected. In one example, the conductors are selected based on impedance in a manner that prevents selection of conductors with impedance greater than $Z_{max}$, such as described by operation 510 in FIG. 5.

Example Optimizing Multiple Design Scenarios

Figure 7:
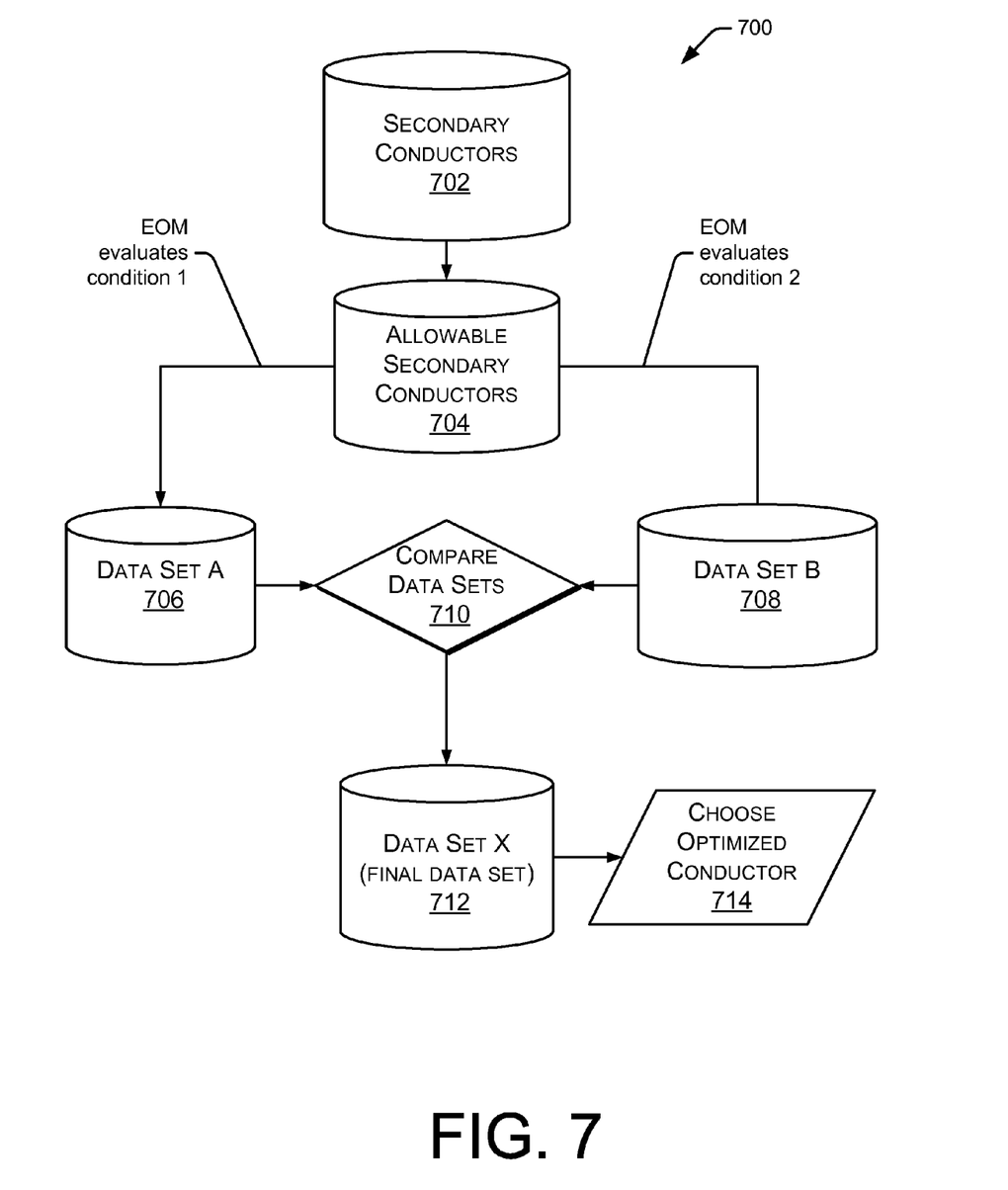
FIG. 7 is flow diagram showing an example of conductor selection from multiple data sets for an optimized solution for multiple design conditions.

FIG. 7 is a diagram showing an example method 700 which depicts one of the actions which may be performed by the secondary conductor sizing module 220. While the example is shown in the context of secondary conductor sizing, the same or similar method may also be applicable to sizing primary conductor and transformers. Within the optimization module each piece of equipment may be evaluated for multiple design scenarios which may be a combination of different analysis conditions on a single layout and/or multiple source points.

In each design scenario, the entire collection of secondary conductor 702 is used as the starting set of material. This set may be reduced to a set of allowable secondary conductors 704 for the design by methods including choosing only conductors that are allowed for optimization, only conductor with a the same number of phases (triplex vs. quadruplex), only conductors with the same construction (conductor-in-conduit CIC, conductor with concentric neutral) etc. In one example, calculations such as those described in FIG. 3, block 304, may be performed on a single design scenario to determine all of the conductors that will satisfy the amount of current expected to flow through this conductor to a load. Data Set A 706 may represent a set of possible conductors associated with a first condition, e.g., a warm region in the summer with high electrical demands related to air conditioning. Due in part to high ambient temperatures, a utility company may not allow their transformers to exceed rated conditions by more than 20%. Similarly, Data Set B 708 may represent a set of possible conductors associated with a second condition, e.g., the same region in the winter, where heating demands may be modest. Due in part to lower ambient temperatures, transformers may be allowed to exceed the rated allowable power by more than 60%. Thus, condition 1 may represent the summer design constraints and condition 2 may represent the winter design constraints for the same design. In an alternative example, the conditions may represent different sources of current. In either example, these data sets 706, 708 may be compared at decision process 710 to create a single and/or final Data Set X 712 which will satisfy all design scenarios. The process of comparing data sets, step 710, is described in greater detail below. From this final set 712, the optimal conductor 714 may be chosen as the least cost material that meets all electrical requirements for all conditions (e.g., as indicated by data set 712).

Figure 8:
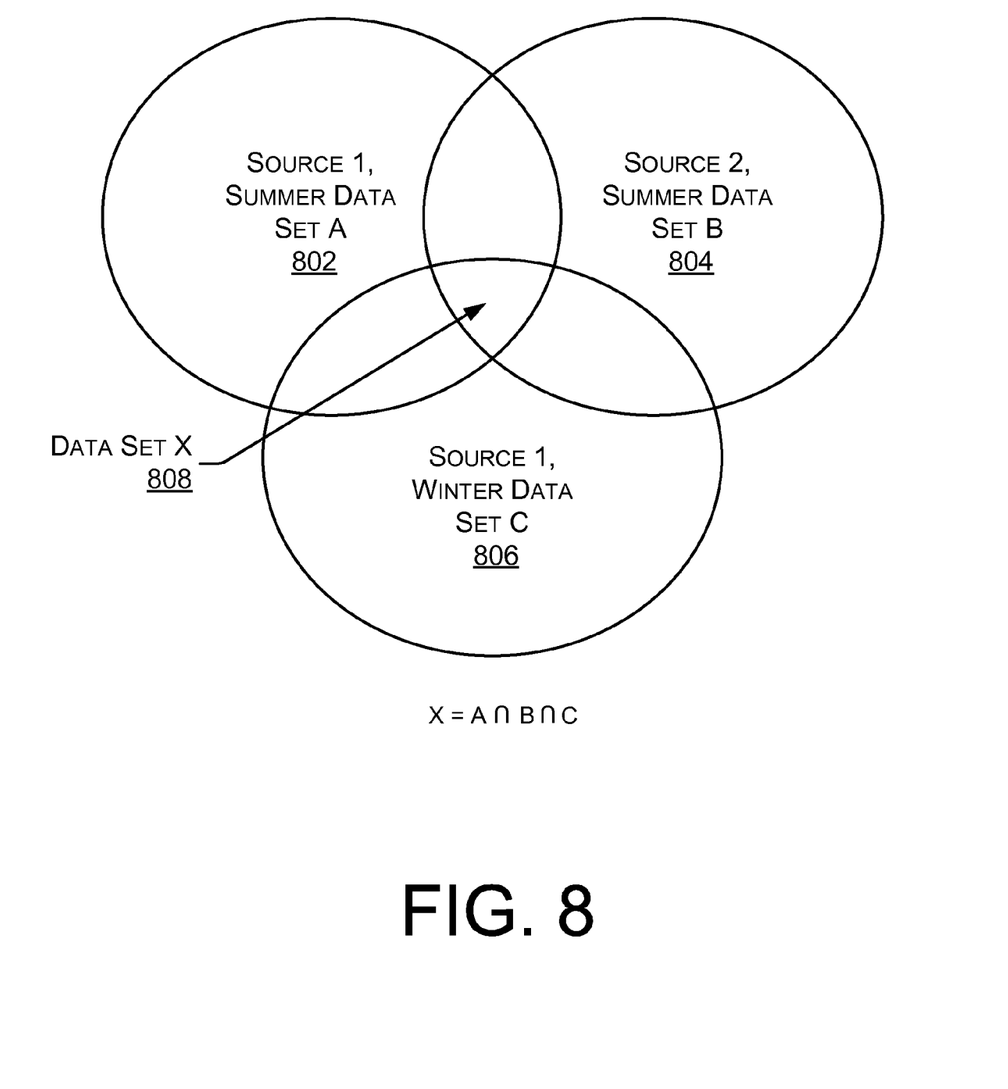
FIG. 8 is a Venn diagram showing the method of choosing a reduced set of equipment that satisfies all design conditions.

In the example of FIG. 7, there are two design conditions (e.g., those represented by Data Sets 706, 708) displayed. However, there may be many design scenarios evaluated simultaneously. In the Example of FIG. 8, a Venn diagram describes aspects of the decision of step 710 of FIG. 7 for an example project with three design conditions that require evaluation. In the decision process, each of the data sets is compared to find the union of all data elements. This can be represented mathematically as:

$$X = A \cap B \cap C \qquad \text{Equation 23}$$

In this example, Data Set X 808 is the set of conductors that will provide an electrically valid solution for the power flowing from source 1 under summer 802 and winter 804 conditions and from an alternate source point under summer conditions 808. This example process may be implemented using a computing algorithm to determine an optimized solution for multiple complex networks.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims

What is claimed is:

1. One or more computer-readable media storing computer-executable instructions that, when executed, cause one or more processors to perform acts comprising:
   sizing secondary conductors based on anticipated loads;
   sizing transformers based on the anticipated loads; and
   sizing primary conductors by:
      evaluating each of a plurality of primary paths to determine that overall voltage drops are less than allowable primary path voltage drops, wherein each of the plurality of primary paths comprises primary segments from among a plurality of primary segments, and wherein primary segments from among the plurality of primary segments are utilized in two or more primary paths;
      calculating an allowable voltage drop for each primary segment, wherein a voltage drop in a primary segment is based on the plurality of the evaluated primary paths, and wherein calculating the allowable voltage drop comprises:
         finding, for each primary segment, a maximum voltage that drops across that primary segment in each of the plurality of primary paths;
         selecting the allowable voltage drop for each primary segment to be a smallest voltage drop of maximum voltage drops associated with that primary segment;
         calculating a maximum impedance of each primary segment based on the allowable voltage drop for that primary segment; and
         selecting a conductor for each primary segment based on the calculated maximum impedance of that primary segment.

2. One or more computer-readable media as recited in claim 1, which cause the one or more processors to perform additional acts comprising:
   generating a starting solution to a distribution system including single-phase and three-phase power, the starting solution including sizing the secondary conductors and sizing the transformers to largest equipment from among a set of equipment that is available;
   checking the starting solution for errors in voltage drops, transformer utilization, conductor utilization and flicker; and
   providing an indication in response to any error indicated by the checking;
   wherein sizing the secondary conductors, sizing the transformers and sizing the primary conductors improves the starting solution.

3. One or more computer-readable media as recited in claim 1, wherein the primary or secondary conductors are sized by allowing selection of a single conductor size for each voltage level.

4. One or more computer-readable media as recited in claim 1, wherein sizing the primary conductors is based in part on:
   determining if multiple primary paths of the plurality of primary paths originate at multiple source points; and
   summing voltage drops over primary segments of the multiple primary paths comprising primary paths originating from each source point of the multiple source points.

5. One or more computer-readable media as recited in claim 1, wherein:
   evaluating each of the plurality of primary paths comprises evaluating multiple primary paths including a same primary segment.

6. One or more computer-readable media as recited in claim 1, which cause the one or more processors to perform additional acts comprising:
   checking a design comprising the sized secondary conductors, the sized transformers and the sized primary conductors for errors including voltage drop, flicker, conductor utilization and transformer utilization; and
   reevaluating the sized secondary conductors, the sized transformers and the sized primary conductors based on the check.

7. A system for sizing components, comprising:
   one or more processors to execute functional blocks comprising:
   a secondary conductor sizing block that sizes secondary conductors based on anticipated loads;
   a transformer sizing block that sizes transformers based on the anticipated loads;
   a primary conductor sizing block that sizes primary segments by:
      calculating a voltage drop over each of a plurality of primary paths as a sum of voltage drops for each primary segment in each primary path, the voltage drops in each primary segment being based on a calculated current and a length of each primary segment;

finding, for each primary segment, a maximum voltage that drops across that segment in each of the plurality of primary paths, wherein each of the plurality of primary paths comprises primary segments from among a plurality of primary segments, and wherein primary paths from among the plurality of primary paths utilize primary segments utilized by other primary paths from among the plurality of primary paths;

calculating an allowable voltage drop for each primary segment as a smallest of a plurality of maximum voltage drops associated with that primary segment in the plurality of primary paths;

selecting the allowable voltage drop for each primary segment to be the smallest voltage drop of the maximum voltage drops associated with that primary segment;

calculating a maximum impedance of each primary segment using the selected allowable voltage drop for that primary segment; and selecting a conductor for each primary segment based on the calculated maximum impedance of that primary segment.

8. The system of claim 7, wherein the primary conductor sizing block allows selection of a same conductor size for primary segments at a same voltage level.

9. The system of claim 7, additionally comprising:
a boundary condition test module that provides an initial sizing of components, by:
generating a starting solution that sizes the secondary conductors and the transformers to largest equipment from among a set of equipment that is available; and
checking the starting solution for errors in voltage drops, transformer utilization, conductor utilization and flicker.

10. The system of claim 7, wherein the primary conductor sizing block is additionally configured for:
determining if the plurality of primary paths are associated with more than one source; and
finding maximum voltage drops for a primary segment included in respective primary paths originating at the more than one source.

11. The system of claim 7, wherein the system for sizing components is adapted to size components in a distribution system including single-phase and three-phase power in the same design.

12. The system of claim 7, wherein:
different primary paths from among the plurality of primary paths branch differently and include different segments; and
the conductor selected for each primary segment is sized to prevent that segment from exceeding a voltage drop determined by the calculating of voltage drops.

13. A method of selecting conductor sizes for primary segments, comprising:
under control of one or more processors configured with executable instructions:
evaluating a plurality of primary paths to determine voltage drops in primary segments, wherein:
each primary path is evaluated as a different combination of primary segments and each of the plurality of primary paths comprises primary segments from among a plurality of primary segments;
not all primary paths that include a same primary segment drop a same voltage over the same primary segment and primary paths from among the plurality of primary paths utilize primary segments utilized by other primary paths from among the plurality of primary paths; and
a total voltage drop of all segments in each primary path is less than a predetermined maximum value;
calculating an allowable voltage drop for each primary segment to be a minimum voltage drop for that segment in all of the evaluated primary paths, wherein calculating the allowable voltage drop comprises:
finding, for each primary segment, a maximum voltage that drops across that primary segment in each of the plurality of primary paths; and
selecting the allowable voltage drop for each primary segment to be a smallest voltage drop of maximum voltage drops associated with that primary segment;
calculating a maximum impedance of each primary segment using the allowable voltage drop for that primary segment; and
selecting a conductor for each primary segment based on the calculated maximum impedance of that primary segment.

14. The method of claim 13, wherein:
evaluating primary paths comprises determining a voltage drop across a primary segment included in primary paths associated with different sources; and
calculating an allowable voltage drop comprises selecting a minimum voltage drop for the primary segment based upon the primary paths associated with different sources.

15. The method of claim 13, wherein calculating an allowable voltage drop comprises:
calculating an allowable voltage drop for at least one primary segment that is included in multiple primary paths originating at multiple sources, respectively.

16. The method of claim 13, wherein evaluating primary paths comprises:
creating an equation for each primary path, the equation including a summation of maximum voltage drops across primary segments in the primary path;
wherein the maximum voltage drops result from a plurality of primary segments having different currents.

17. The method of claim 13, wherein selecting the conductor for each primary segment comprises selecting a single conductor for all primary segments, the single conductor sized to prevent voltage drops across any primary segment from exceeding the allowable voltage drop for that segment.

18. One or more computer-readable media as recited in claim 1, which cause the one or more processors to perform additional acts comprising displaying, via a user interface, potential failure points of an electrical grid comprising at least the secondary conductors, the transformers, and the primary conductors.

* * * * *